United States Patent [19]

Bauman et al.

[11] Patent Number: 5,875,119

[45] Date of Patent: Feb. 23, 1999

[54] COMPUTER PERFORMANCE MONITORING USING TIME-DIVISION MULTIPLEXING

[75] Inventors: Mitchell Anthony Bauman, Circle Pines; Michael Allen Fahland, Oakdale; Donald William Mackenthun, Fridley, all of Minn.; Nguyen Thai Tran, Mountain View, Calif.

[73] Assignee: Unisys Corporation, Blue Bell, Pa.

[21] Appl. No.: 787,699

[22] Filed: Jan. 28, 1997

[51] Int. Cl.[6] ...................................................... H08J 3/04
[52] U.S. Cl. .................... 364/551.01; 370/537; 370/540; 395/183.13; 395/184.01; 711/209; 711/211; 364/238
[58] Field of Search ................................ 364/551.01, 238; 370/537, 540; 395/183.13, 184.01; 711/209, 211

[56] References Cited

U.S. PATENT DOCUMENTS

| | | | |
|---|---|---|---|
| 4,742,515 | 5/1988 | Dabholkar et al. | 370/537 |
| 4,833,673 | 5/1989 | Chao et al. | 370/537 |
| 5,479,398 | 12/1995 | Cyr | 370/537 |
| 5,541,921 | 7/1996 | Swenson et al. | 370/376 |
| 5,557,548 | 9/1996 | Gover et al. | 364/551.01 |
| 5,627,825 | 5/1997 | Barraclough et al. | 370/260 |

*Primary Examiner*—James P. Trammell
*Assistant Examiner*—Hien Vo
*Attorney, Agent, or Firm*—Charles A. Johnson; Mark T. Starr; Merchant, Gould, Smith, Edell, Welter & Schmidt

[57] ABSTRACT

A system and method for monitoring and collecting performance characteristics of a target system and providing the results by way of time-division multiplexing is provided. The performance monitor includes a mechanism for latching a plurality of performance attribute signals. An output circuit, coupled to the latching mechanism, is used to output the latched performance attribute signals in groups, wherein each of the groups is a subset of all of the performance attribute signals. The performance monitor further includes a time division circuit coupled to the output circuit, to allow the output circuit to output each of the groups of performance attribute signals at different times. Each group of performance attribute signals can therefore be transmitted via common output access points, although at different times as the groups are transmitted in succession.

28 Claims, 5 Drawing Sheets

COMPUTER PERFORMANCE MONITORING USING TIME-DIVISION MULTIPLEXING

FIELD OF THE INVENTION

This invention relates generally to performance monitoring, and more particularly to a system and method for monitoring and collecting performance characteristics of a target system and providing the results via time-division multiplexing.

BACKGROUND OF THE INVENTION

Performance monitoring is a concept used mainly in connection with the analyzation of computer system performance. A performance monitor system typically includes circuitry to collect data for machine analysis and testing without influencing operation of the computer system during normal operation. The circuitry monitors various signals within the computer system, printed circuit board (PCB), component, or application-specific integrated circuit (ASIC), which is gathered and made available to various data storage, computational, or analyzing devices.

Performance monitoring of a computer system allows specific events to be monitored in order to gauge performance, or take appropriate remedial action when necessary. Many different types of events within the computer system can be monitored, and collected data can be presented to connector pins where it can be read and processed by devices such as logic analyzers.

In one prior art performance monitoring system, a connector pin was dedicated to each signal that was monitored. When monitoring printed circuit boards, this often meant that entire connectors had to be dedicated as a performance monitor connector, increasing the expense of the printed circuit board, and reducing the available area for input/output (I/O) signals. This problem is particularly evident where a performance monitor is integrated into a logic design of a gate array or other ASIC. In such a case, only a predetermined number of array pins are available for a particular package type, and the inclusion of a great number of performance monitor pins greatly reduces the amount of logic available for use in the ASIC.

Other prior art performance monitors did not provide for continuous operation under all circumstances. For example, many performance monitors did not continue to collect new performance data while previously collected performance data was being transferred to the external interface. In other words, the performance monitor stopped collecting data while it provided its captured data to an external data analyzer. Furthermore, prior art performance monitors require that the system clock be stopped before changing any mode of operation for the performance monitor. Therefore, where a different mode of performance monitoring was desired, the system was stopped to change the mode of the performance monitoring, which is obviously disruptive to the normal operational of the computer system.

The performance monitor of the present invention provides more versatility than the performance monitors of the prior art, while improving performance and increasing speed. The performance monitor of the present invention allows a much smaller number of connector pins to provide the same information previously requiring a connector pin for each signal which was monitored. The number of connector pins required can be set to a fixed number thereby eliminating any question as to the number of connector pins which are available for normal use. Furthermore, the present invention provides more accurate data profiles, and increases the overall speed in which collected data can be provided by the performance monitor. This is in part due to a unique mode switching feature which allows the computer system, component, or ASIC to continue to operate normally even during performance monitoring mode switching.

The present invention therefore overcomes the aforementioned and other problems of the prior art by providing a novel performance monitoring system capable of continuous multi-mode operation, while increasing speed and performance using a greatly reduced, and predictable, number of connector pins. The present invention further provides a solution to other problems, and offers other advantages over the prior art.

OBJECTS OF THE INVENTION

It is a primary object of the invention to provide an improved performance monitor system for measuring the performance of a computing system.

Still another object of the invention is to reduce the number of external pins needed to conduct performance monitoring on the same number of signals as where each signal required it's own external connector pin It is a further object of the invention to allow data to continue to be collected while other data is being transferred to the external interface.

It is another object to increase the accuracy of data profiles provided by the performance monitoring system by transfering data to the external interface while additional data is being collected, thereby having no periods of time where data is not being collected.

Yet another object of the invention is to increase the rate at which data is transferred from the performance monitor system.

It is still another object to provide a programmable performance monitoring system having multiple modes of operation which can be dynamically changed.

Other more detailed objectives will become apparent from a consideration of the Drawings and the Detailed Description of the Preferred Embodiment.

SUMMARY OF THE INVENTION

The present invention relates to a system and method for monitoring and collecting performance characteristics of a target system and providing the results by way of time-division multiplexing.

In accordance with one aspect of the invention, a performance monitor for collecting a plurality of performance attributes of a circuit is provided. The performance monitor includes a mechanism for latching a plurality of performance attribute signals. An output circuit, coupled to the latching mechanism, is used to output the latched performance attribute signals in groups, wherein each of the groups is a subset of all of the performance attribute signals. The performance monitor further includes a time division circuit coupled to the output circuit, to allow the output circuit to output each of the groups of performance attribute signals at different times. Each group of performance attribute signals can therefore be transmitted via common output access points, although at different times as the groups are transmitted in succession.

In accordance with another aspect of the invention, a method for collecting performance characteristics of a circuit is provided. The method includes latching the performance characteristics, and outputting the performance characteristics in groups. Each of the groups is a subset of a total number of the performance characteristics being collected. The method also includes regulating the output of the groups of performance characteristics so that the groups of performance characteristics are transmitted in succession.

In accordance with yet another aspect of the invention, a system for analyzing the performance of a computing system is provided. The system includes a performance monitor, which in turn includes a mechanism for latching a plurality of performance attribute signals. The performance monitor also includes an output multiplexer, coupled to the latching mechanism, which is used to output the latched performance attribute signals from an output terminal in groups, where each of the groups are subsets of all of the performance attribute signals. The performance monitor further includes a time division circuit coupled to the output circuit, to allow the output circuit to output each of the groups of performance attribute signals at different times. The system also includes a logic analyzer, coupled to the output terminal of the output multiplexer, to receive the groups of performance output signals, and to analyze the performance of the computing system in response thereto.

Still other objects and advantages of the present invention will become readily apparent to those skilled in this art from the following detailed description, where the preferred embodiment of the invention is shown by way of illustration of the best mode contemplated of carrying out the invention. As will be realized, the invention is capable of other and different embodiments, and its details are capable of modification without departing from the invention. Accordingly, the drawing and description are to be regarded as illustrative in nature, and not as restrictive.

DETAILED DESCRIPTION OF THE ILLUSTRATED EMBODIMENTS

Figure 1:
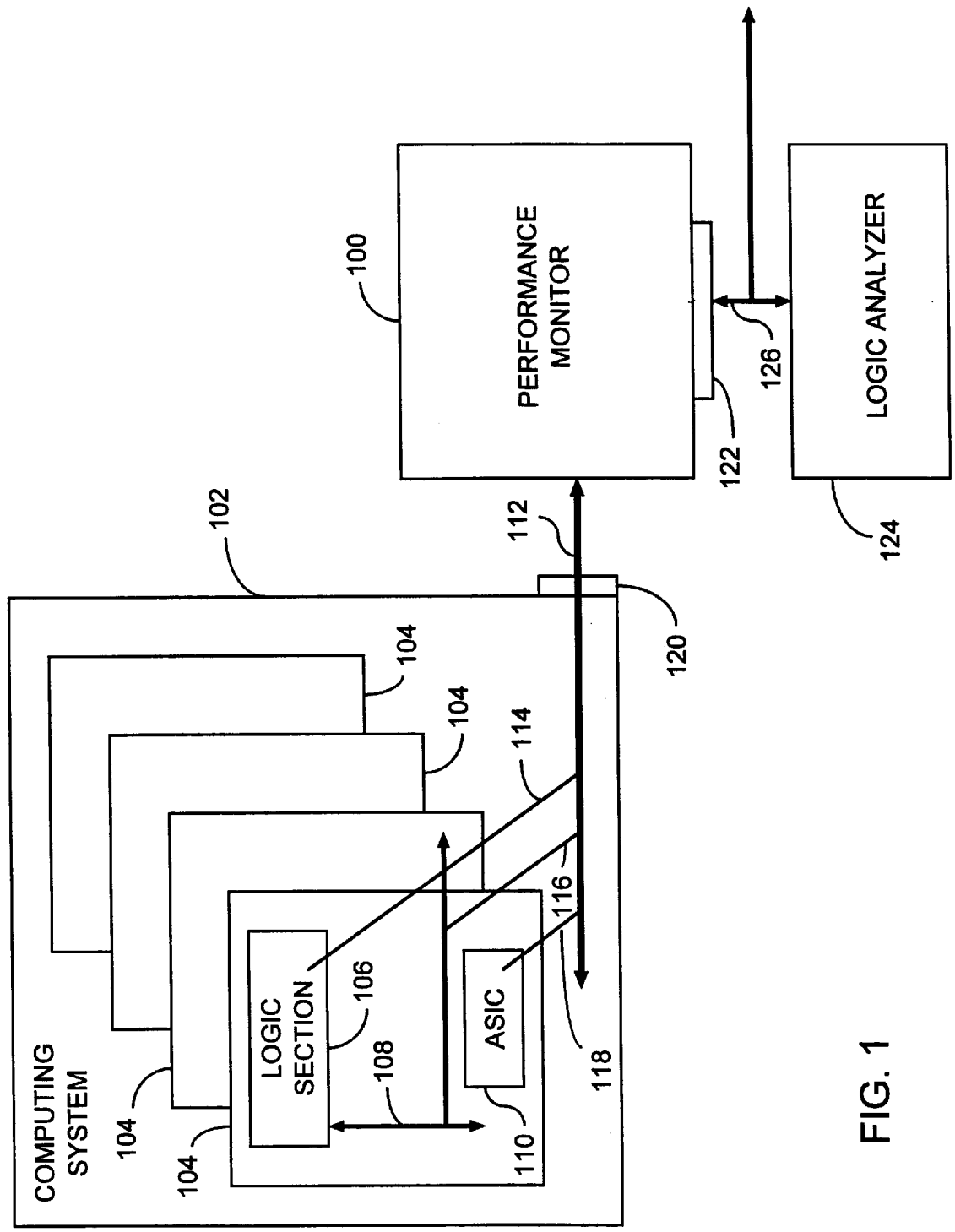
FIG. 1 is a block diagram illustrating one embodiment of the interconnection between a performance monitor and a target system which is to be monitored.

FIG. 1 is a block diagram illustrating one embodiment the inner connection between the performance monitor 100 and a computing system 102 which is to be monitored. Many different types of logic designs may be monitored for their performance, however it is particularly advantageous to use a performance monitor to gauge the performance of a computing system such as computing system 102. The computing system being monitored may include a plurality of printed circuit boards (PCB) 104, each of which can be monitored for their performance. Various parts of each printed circuit board may also be monitored, such as predefined logic sections 106, busses 108, ASICs 110, as well as other components.

FIG. 1 illustrates a performance monitor 100 that is separate from the computing system 102. In this case, the portions of the computing system 102 being monitored must provide the appropriate signals to the performance monitor 100. This is accomplished via bus 112, which comprises all signals to be monitored from the computing system 102. The logic section 106, bus 108, and ASIC 110 each have performance signal busses providing predetermined signals to the bus 112, including performance bus 114 from the logic section 106, bus 116 from the bus 108, and performance bus 118 from the ASIC 110.

In one embodiment of the invention, the signals on performance busses 114, 116, and 118, and/or the combined signals on bus 112, are routed to a connector 120, or connectors on the PCBs 104 individually, to provide the signals to the performance monitor 100. Alternatively, the performance monitor may be integrated into a logic section or ASIC. For example, the performance monitor logic may be integrated into an ASIC 110 such that the hardware of the performance monitor 100 is included within the logic circuitry of ASIC 110.

The performance monitor 100 includes circuitry to receive information concerning particular sections or components of the computing system 102. This information is collected at the performance monitor 100, where it can then be forwarded to data analyzing devices. In one embodiment, the performance monitor 100 includes a connector 122 that provides the collected data to a logic analyzer 124 or other data storage, computational, or analyzing devices via bus 126. Where the performance monitor 100 is integrated into a particular one or more logic sections or ASICs, such as ASIC 110, the performance monitor signals are provided directly by the ASIC package pins rather than by a separate connector such as connector 122.

The logic analyzer 124 can be used in connection with the performance monitor 100 to analyze the data collected by the performance monitor 100. Logic analyzers in their simplest form are multi channel oscilloscopes used to detect logic states in a design. Logic analyzers also include memory for shifting in data and storing a predetermined number of bits for each analyzer channel. Such logic analyzers can be particularly helpful in analyzing bus signals such as those on bus 112. Other devices for storing data or analyzing data can also be coupled to the performance monitor 100, such as a computer having a memory.

Figure 2:
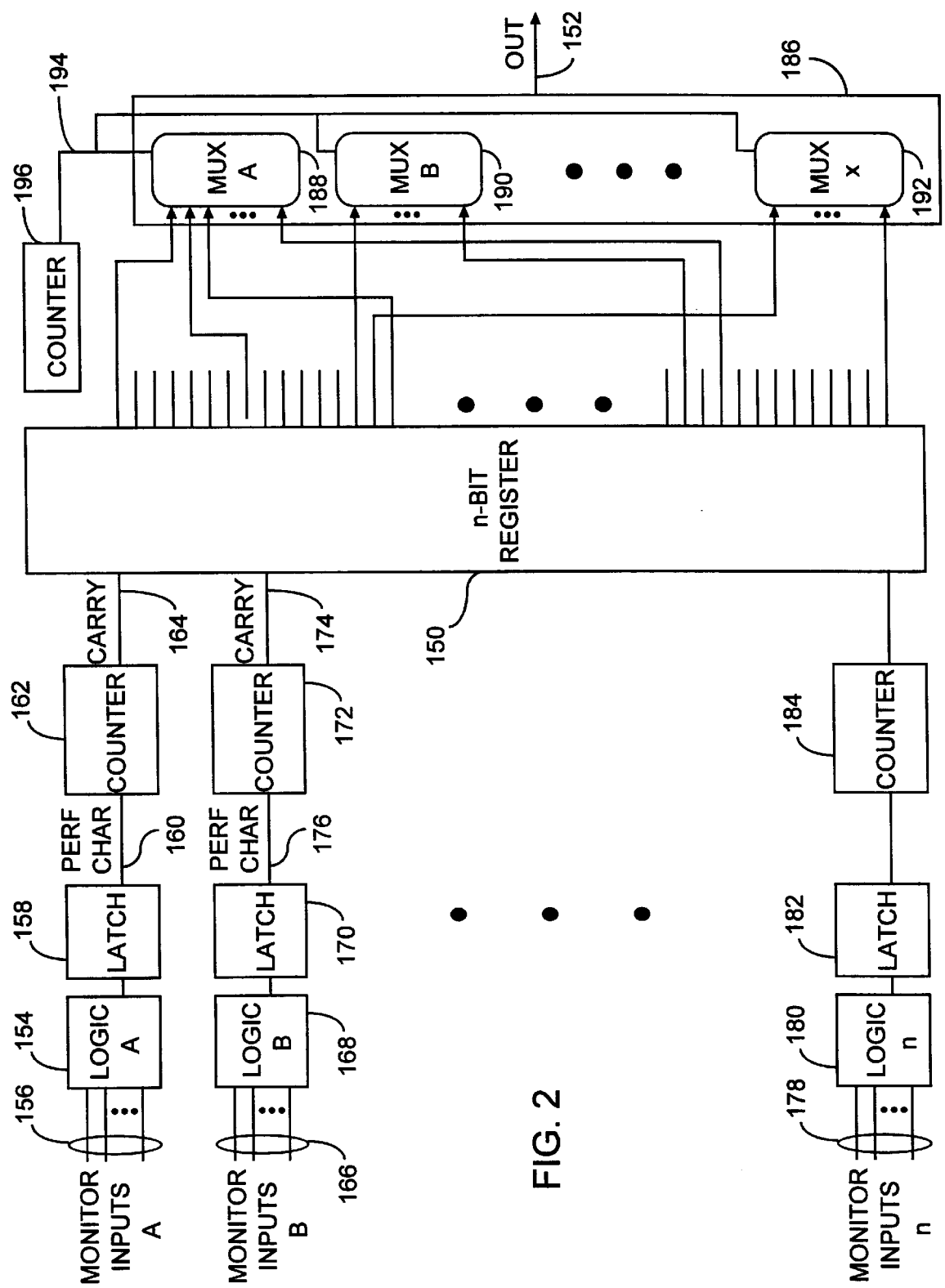
FIG. 2 illustrates one embodiment of the performance monitor of the present invention.

FIG. 2 illustrates one embodiment of the performance monitor 100 of the present invention. Generally, a number (n) of performance characteristics targeted for monitoring are input to the n-bit register 150, which are then time-multiplexed as outputs on line 152. The time-multiplexed characteristics of the performance monitor of the present invention allow the targeted performance characteristics to be analyzed faster and more efficiently, while requiring fewer actual access points (e.g., connector pins, pin-grid-array (PGA) pins, etc.).

The monitor inputs A represent one or more signals being input to logic A 154 via lines 156. A single signal may be monitored, therefore comprising the entirety of the monitor inputs A. In such a case, the logic A 154 may not be required for that particular targeted performance characteristic. However, in other embodiments, a plurality of signals together represent a particular targeted performance characteristic, thereby requiring a plurality of monitor inputs A.

Where a plurality of monitor inputs A together represent the particular targeted performance characteristic, the logic A 154 may be used to perform combinational logic functions on the inputs from lines 156, in order to determine whether the logic states of the multiple monitor inputs A indicate the presence of the particular performance characteristic targeted. For example, a performance characteristic which may be monitored could be the simultaneous presence of four signals. In this case, the logic A 154 would include an AND function to determine whether all four signals are simultaneously present, and the results would then be passed to the latch 158 which performs a buffering function. As will be appreciated by those skilled in the art, the latch 158 may not be necessary in situations where buffering is not required. Such a case is where only one signal is present as the monitor input A, where the signal is such that no buffering is required.

Regardless of the number of monitor inputs A on line(s) 156, the targeted performance characteristic will be presented on line 160 to a counter 162. The counter 162 changes state each time the performance characteristic occurs. In other embodiments of the invention, the counter 162 is not utilized, but rather binary information (such as an address, an instruction, etc.) is captured in a register for later analysis. One such embodiment will be described in connection with FIG. 3.

The counter can be initialized to a particular value and decrement each time the performance characteristic occurs. However, in a preferred embodiment, the counter is incremented each time the performance characteristic occurs, until the counter 162 increases to such a point that a carry bit (or overflow bit) on line 164 from the counter is set. The number of performance characteristics occurring before the carry bit is set is dependent on the size of the counter. For example, the next count increment after a 64-bit counter has incremented sixty-four times results in a count "roll-over". The present invention recognizes the counter rollover, and sets the carry bit on line 164. The asserted signal on line 164 represents that targeted performance characteristic has occurred a predetermined number of times. At such time, the asserted signal on line 164 is stored in the n-bit register 150.

A number n targeted performance characteristics may be input to the n-bit register 150. For example, a second performance characteristic, defined by one or more monitor inputs B on line(s) 166, may be stored in the n-bit register 150. As was described in connection with the monitor inputs A above, circuitry (labeled logic B 168) is included to determine whether a plurality of the monitor input B signals are at a predetermined logic state indicating the occurrence the performance characteristic. The resulting signal is latched by latch 170, and the performance characteristics are counted by the counter 172 to generate a carry signal on line 174 when a predetermined number of the performance characteristics from line 176 have occurred. Up to "n" performance characteristics can be monitored in this way, as represented by monitor inputs n on lines 178, logic n 180, latch 182 and counter 184.

The n-bit register 150 receives each of these signals, and provides the register contents to an output multiplexer 186, which performs a portion of the time-division multiplexing. In one embodiment of the invention, the output multiplexer 186 includes a plurality of separate multiplexers, shown as MUX-A 188, MUX-B 190, through MUX-x 192. In this case, the register 150 contents are divided such that a particular number of the n outputs to the n-bit register 150 are directed to each of the multiplexers 188, 190 through 192. For example, where n=48, six 8-input multiplexers are used in the output multiplexer 186. Each multiplexer 188, 190 through 192 includes a control input to receive control signals on lines 194, where the number of control signals depends on the number of inputs to each individual multiplexer 188, 190 through 192. For example, where each multiplexer 188, 190 through 192 has eight inputs, 3 control lines are required, as will be appreciated by those skilled in the art. Because each multiplexer 188, 190 through 192 receives the same control signals from lines 194, one of the inputs from each of the multiplexers 188, 190 through 192 will be selected to pass a performance characteristic from the register contents of the n-bit register 150. One selected signal from each of the multiplexers 188, 190 through 192 represents the outputs represented on line 152 of the performance monitor.

The control signals represented on lines 194 select a particular input from each of the multiplexers 188, 190 through 192 to be outputted from the output multiplexer 186. Where multiplexers 188, 190 through 192, are eight-input multiplexers, three control signals are used on three lines 194, and each different binary state of the control signals on lines 194 will select a different one of the inputs to be outputted at each of the multiplexers 188, 190 through 192. For example, where the three control signals (control bits 0, 1 and 2) have a binary value of "000", a first input of each of the multiplexers 188, 190 through 192 is selected as one of the outputs represented on line 152. Where the three control signals have a binary value of "001", a second input of each of the multiplexers 188, 190 through 192 is selected as one of the outputs represented on line 152. Table 1 below illustrates the relationship between the multiplexer inputs and the control signals for three control signals:

TABLE 1

| INPUT NO. OF EACH MUX | 1 | 2 | 3 | 4 | 5 | 6 | 7 | 8 | 1 |
|---|---|---|---|---|---|---|---|---|---|
| CONTROL SIGNAL 2 (BINARY) | 0 | 0 | 0 | 0 | 1 | 1 | 1 | 1 | 0 |
| CONTROL SIGNAL 1 (BINARY) | 0 | 0 | 1 | 1 | 0 | 0 | 1 | 1 | 0 |
| CONTROL SIGNAL 0 (BINARY) | 0 | 1 | 0 | 1 | 0 | 1 | 0 | 1 | 0 |

As can be seen from Table 1, the state of the control signals (including control signal 1, control signal 2, and control signal 3) selects a different multiplexer input from each of the multiplexers. Therefore, these individual multiplexers can be divided in time to utilize time-division multiplexing by changing the control inputs over time. For eight-input multiplexers, this can be accomplished using a 3-bit counter 196 which provides eight different output states. Therefore, where the counter 196 is at a first state (e.g., "000"), one input from each of the multiplexers 188, 190 through 192 is selected to be present at the outputs on line 152. Where the counter 196 is at a second state (e.g., "001"), a different input from each of the multiplexers 188, 190 through 192 is selected to be present at the outputs on line 152. This continues until the counter 196 reaches its highest count value (e.g., "111"), at which time it returns to its original state ("000") to again select the first input. The counter is preferably incremented upon the occurrence of a synchronous clock signal in order to provide substantially equal time periods for each state of the 3-bit counter 196.

A predetermined number of performance characteristics stored in the n-bit register 150 are outputted at a particular time, and a different set of the performance characteristics are outputted at each different "time slot" generated by the counter 196. Each of the "predetermined number" of performance characteristics can be presented at a corresponding access point (e.g., connector pin, pin-grid-array (PGA) pin, etc.). In this manner, all of the performance characteristics can be seen at the output of the output multiplexer 186; however a predetermined number of these characteristics will be present at a given time at a predetermined number of access points. In other words, the performance characteristics will be transmitted in data packets having "m" bits, where "m" is the predetermined number of performance characteristics stored in the n-bit register 150 that are outputted at a particular time. The use of more multiplexers in the output multiplexer 150 will increase the number of bits in the data "packet", therefore also increasing the number of access points needed. Also, where the number of data packet bits (and therefore the number of pins used) is to remain constant, an increase in the number of performance characteristics to be monitored can be accommodated by increasing the number of inputs associated with each multiplexer within the output multiplexer 150.

Figure 3A:
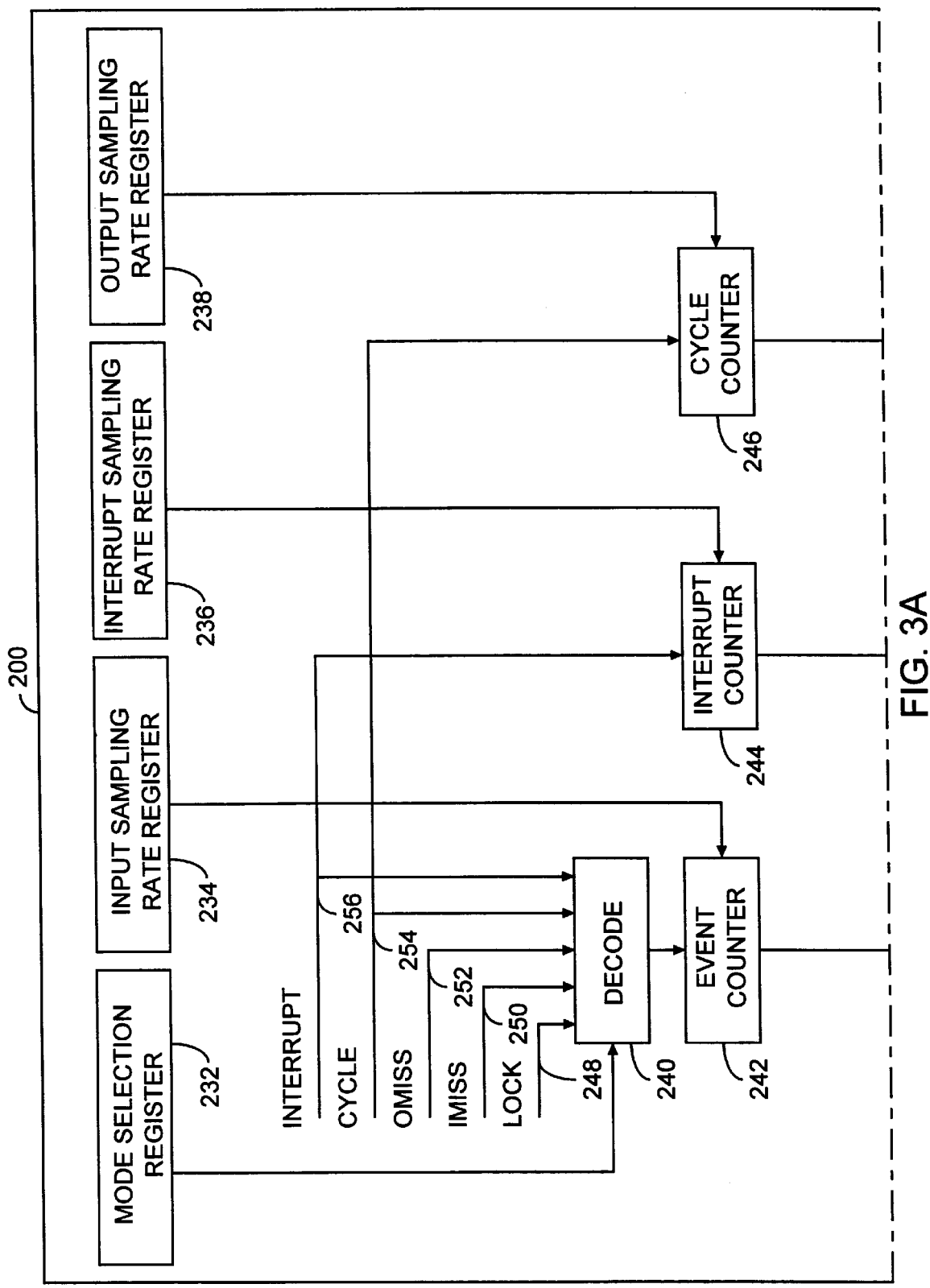
FIG. 3 illustrates a more detailed embodiment of a performance monitoring system in accordance with the present invention.
Figure 3B:
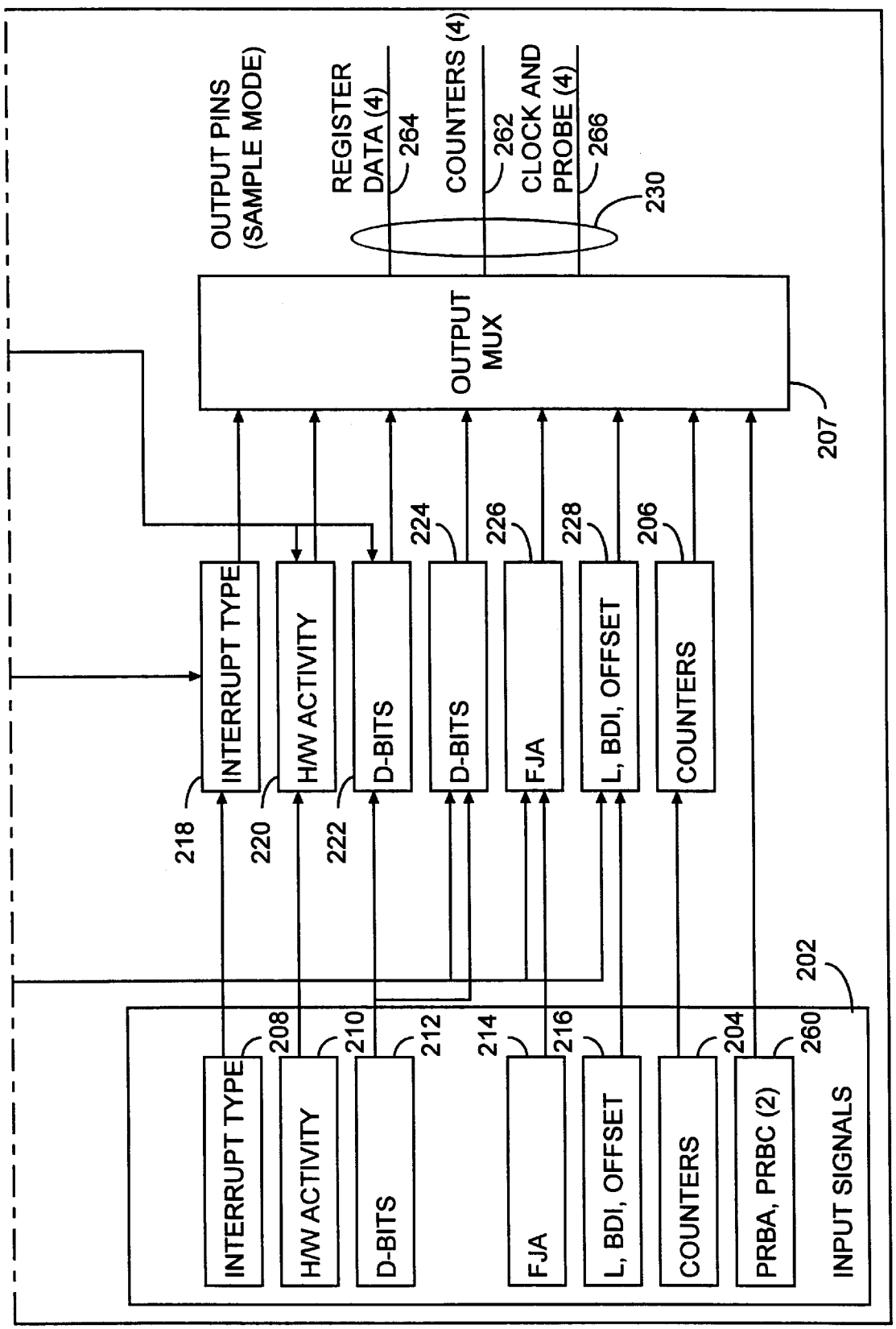

FIG. 3 including FIGS. 3A and 3B, illustrates a more detailed embodiment of a performance monitor 200 in accordance with the present invention. The particular embodiment illustrated in FIG. 3 is a performance monitor for an instruction processor (IP) in a large-scale computer system. The performance monitor 200 provides access to a group of signals in the IP (not shown), and allows for an external analyzer to be connected to sample the hardware activity of the IP.

The performance monitor 100 of FIG. 2 was shown to collect data from counters (hereinafter "counter data"). The performance monitor 200 of FIG. 3 collects both data from counters, and data from sampled registers. Therefore, the performance monitor 200 illustrates another "category" of data which can be collected and monitored (hereinafter "register data"). This category of data is the actual data in a hardware register (e.g., instruction function codes, operand addresses, designator bits, interrupt types, etc.), rather than only the "occurrence" of particular events (e.g., cache miss, cache hit, etc.).

FIG. 3 illustrates a representative example of the monitoring of both register data and counter data. The inputs to the performance monitor 200 are shown at the input terminal 202. The inputs include both register and counter data. For example, the input labeled counters 204 is analogous to the counter inputs described in connection with FIG. 2, which were labeled the monitor inputs A, B through n on lines 156, 166 through 178 respectively. The counter inputs of FIG. 3 for receiving the counter data enters the counter latch 206, which was analogously represented in FIG. 2 as the n-bit register 150. The output multiplexer 207 of FIG. 3 is analogous to the output multiplexer 186 of FIG. 2, except that the output multiplexer 207 will also multiplex register data as well as the latched counter data from counter latch 206.

Other inputs of FIG. 3 represent inputs for register data, such as register data inputs 208, 210, 212, 214 and 216. These inputs collect actual data from hardware registers, so that the register information may be analyzed. In the embodiment of FIG. 3, the register data received at inputs 208, 210, 212, 214 and 216 includes interrupt types, hardware activities, designator bits, FJA fields (particular instruction function codes) and L,DBI,Offset instructions (particular instruction virtual address) respectively. The particular register data collected is not relevant to the inventive concept of the present invention, and will not be described in further detail.

Each of the register data inputs 208, 210, 212, 214 and 216 received at the input terminal 202 enters an output latch. Register data input 208 enters the interrupt type output latch 218, register data input 210 enters the hardware activity output latch 220, register data input 212 enters the designator bit output latches 222 and 224, register data input 214 enters the FJA output latch 226, and register data input 216 enters the L,DBI,Offset output latch 228. The register data output latches have controlled outputs, which will be described in more detail below.

Each of the register data output latches is coupled to the output multiplexer 207, where the register data is multiplexed in the same manner as the previously described counter data. The output multiplexer 207 of FIG. 3 includes a plurality of output signals on external interface 230, which will also be described in greater detail below.

The embodiment illustrated in FIG. 3 includes multiple control registers, labeled the mode selection register 232, the input sampling rate register 234, the interrupt sampling rate register 236 and the output sampling rate register 238. These control registers control the functions performed by the performance monitor 200. The control registers provide a great deal of flexibility by allowing mode designations, various sampling rate designations, as well as other definable functions. The control registers associated with the illustrated embodiment of FIG. 3 are summarized in Table 2 below:

TABLE 2

| Control Register | Width (bits) | Function | Initialization |
|---|---|---|---|
| Mode Selection | 4 | Selects the mode of operation: Sample Mode, or Store Mode. In Sample Mode, it also selects which event will cause the data to be latched, and whether or not the Idle software state is included in the counts. | Dynamic Scan |
| Input Sampling Rate | 16 | Determines the number of events (of the type selected by the Mode Selection register) that occur between samples. When this number of events occur, the registers are latched into the output registers. | Dynamic Scan |
| Interrupt Sampling Rate | 8 | When the Mode Selection Register specifies sampling by interrupt, then the interrupt type is latched by the Event Trigger. In all other modes, the interrupt type is sampled based on the number of interrupts selected by this register. | Static Scan |
| Output Sampling Rate | 16 | The register data is presented to the external interface at a period selected by the Output Sampling Rate register. The value of this register represents the number of cycles between output samples. | Static Scan |

The illustrated mode selection control register 232 is a 4-bit register used to select the mode of operation. There are two modes of operation in a preferred embodiment of the invention, namely a "sample" mode and a "store" mode. Store mode transfers only a subset of the register data, but at a higher rate than transfers in sample mode. Sample mode transfers counter and register data, and also directs the decode circuitry 240 to select which event will cause the data to be latched. Sample mode also indicates whether or not the idle software state is included in the counts (the idle software state may be excluded from the measurement data).

The illustrated input sampling rate control register 234 is a 16-bit register used to determine the number of events that occur between samples. When this number of events occurs, the registers are latched into the output registers. For example, where the input sampling rate control register 234 is set to indicate that sixty-four events will occur between samples, the sixty-fourth event will cause output latches 224, 226 and 228 to latch the register data from inputs 212 and 214 to the output multiplexer 207. The event counter 242 performs the counting function, and counts the events that have been selected by the decode circuitry 240 at the direction of the mode selection register 232. In one embodiment, the input sampling rate register includes the initial value of the event counter 242, which captures the data into the output registers (e.g., 224, 226 and 228) when decremented to zero.

The illustrated interrupt sampling rate control register 236 is an 8-bit register used where the decode circuitry 240 has selected the type "interrupt" to enter the event counter 242. This register indicates the number of interrupts which occur between successive latches of the interrupt type onto the output register. In one embodiment, the interrupt sampling rate register includes the initial value of the interrupt counter 244, which captures the interrupt type of the current interrupt into the output register 218 when decremented to zero.

The illustrated output sampling rate control register 238 is a 16-bit register used to determine how frequently the latched register data is transferred to the output pins at the external interface 230. Therefore, the register data is presented to the external interface 230 at a period selected by the output sampling rate register 238. The value of this register represents the number of clock cycles between output samples. In one embodiment, the output sampling rate register includes the initial value of the cycle counter 246. When the cycle counter 246 decrements to zero, the current hardware activity state in output register 220 and the current designator bits in output register 222 are latched at the input of the output multiplexer 207.

Each of these control registers (232, 234, 236 and 238) is initialized with a value corresponding to the particular mode, input sample rate, interrupt sample rate, and output sample rate respectively. As shown in Table 2, this initialization can occur in at least one of two ways. The first manner in which initialization can occur is via static scanning, which is used for the interrupt sampling rate register 236 and the output sampling rate register 238. The second manner is via dynamic scanning, which is used for the mode selection register 232 and the input sampling rate register 234.

Generally, scan design approaches comprise an operation wherein certain desired logic patterns are serially inputted and shifted to the appropriate latch locations. A static scan operation is a scan operation where the unit is operated in the "shift mode" (i.e., by withholding the system clock excitations and turning on the shift scan control signals to the unit). This therefore requires stopping the system clock, or performing the scan prior to the time the system clock starts. A dynamic scan operation is a scan operation where scanning may occur even where the system clock is operating, thereby eliminating the need to stop the system clock. For performance monitoring systems clocked by the same system clock which is clocking the system under test, the ability to initialize the mode selection register 232 and the input sampling rate register 234 via dynamic scanning provides a great deal of flexibility for the performance monitor 200. This is because these registers can be modified during normal operation of the system under test.

In one embodiment of the invention, the mode selection register 232 indicates which of the "trigger events" will cause certain register data to be latched by the output latches. These dynamically-scannable mode selections are shown in Table 3 below:

TABLE 3

| Mode Selection Register Value | Mode | Include Idle State | Trigger Event | Data Set Presented |
|---|---|---|---|---|
| 0001 | Sample | Yes | Cycle | Instruction Address |
| 0010 | Sample | Yes | Instruction | Instruction Address |
| 0011 | Sample | No | Cycle | Instruction Address |
| 0100 | Sample | No | Instruction | Instruction Address |
| 0101 | Sample | No | Instruction Miss | Instruction Address |
| 0110 | Sample | No | Operand Miss | Instruction Address |
| 0111 | Sample | No | Lock Instruction | Instruction Address |
| 1100 | Sample | Yes | Interrupt | Instruction Address |
| 1000 | Sample | No | Operand Miss | Operand Address |
| 1001 | Sample | No | Lock Instruction | Operand Address |
| 1101 | Sample | Yes | Interrupt | operand Address |
| 1010 | Store | Yes | Cycle | Store Data |
| 1011 | Store | No | Cycle | Store Data |

In the modes which exclude the idle state, the event counter 242 is not changed when the designator bits indicate that the processor is in the idle software state. The trigger event is listed for each of the mode selection register values, where the trigger events include a lock instruction trigger (shown on trigger line 248), an instruction cache miss trigger (shown on trigger line 250), an operand cache miss trigger (shown on trigger line 252), a cycle trigger (shown on trigger line 254), and an interrupt trigger (shown on trigger line 256). The corresponding data sets presented for each of these modes and trigger events are listed in Table 3. Table 3 is only one example of how the mode selection register 232 may be defined.

Various event triggers may be specified by the mode selection register 232. Event triggers are designed to work only in sample mode. Store mode works only with cycle triggers, which means that the event selection for store mode is always by cycle. Because cycle triggers are those related only to a clock cycle number, store mode can operate faster than sample mode. Table 4 below lists one embodiment of the various trigger events and their corresponding definitions:

TABLE 4

| Trigger | Meaning of Event-Triggered Data |
|---|---|
| By cycle | Associated with the instruction being executed during the nth clock cycle, where n is the value of the input sampling rate register. |
| By Instruction | Associated with the nth instruction, where n is the value of the input sampling rate register. |
| By Instruction Miss | Associated with the instruction causing the nth instruction miss, where n is the value of the input sampling rate register |
| By Operand Miss | Associated with the instruction causing the nth operand miss, where n is the value of the input sampling rate register. |
| By Lock | Associated with the nth lock instructions, where n is the value of the input sampling rate register. |
| By Interrupt | Associated with the nth interrupt, where n is the value of the input sampling rate register. |

A "cycle" trigger involves triggering on a particular clock cycle. This trigger event, shown on line 254, is associated with the instruction being executed on the "nth" clock cycle, where "n" is the value of the input sampling rate register 234. An "instruction" trigger (not shown) involves triggering on the nth occurrence of an instruction, where "n" is the value of the input sampling rate register 234. "Instruction miss" and "operand miss" triggers, shown on lines 250 and 252, involve triggering on the instruction causing the nth instruction cache miss or nth operand cache miss respectively, where "n" is the value of the input sampling rate register 234. A "lock" trigger, shown on line 248, involves triggering on the nth lock instruction, where "n" is the value of the input sampling rate register 234. Finally, an "interrupt" trigger, shown on line 256, involves triggering on the nth interrupt, again where "n" is the value of the input sampling rate register 234. As will be appreciated by those skilled in the art, trigger events other than those listed in Table 4 could be implemented without departing from the scope and spirit of the invention.

The external interface 230 at the output of the output multiplexer 270 provides the selected performance characteristics to an external analyzing device, such as the logic analyzer 124 of FIG. 1. The number of output pins at the external interface is dependent upon the number of performance characteristic signals desired, and the size of the multiplexers comprising the output multiplexer. In one embodiment of the invention, twelve output pins comprise the external interface 230. Having a small, fixed number of access points is greatly beneficial, particularly where access points (such as connector pins and PGA pins) are limited.

The output pins comprising the external interface 230 differs depending on the mode of operation defined by the mode selection register 232. In sample mode, four output pins are used for counter data, four for register data, and four for clock and synchronization signals, and probe instruction signals. The clock and synchronization signals are discussed in connection with FIGS. 4 and 5. The probe instructions signals are shown in FIG. 3 at the PRBA,PRBC input 260, which are instructions that can be placed at desired locations in the normal instruction stream of the system under test. The performance monitor 200 can therefore monitor for the presence of these instructions, which may be beneficial in situations where microcode access information is desired. For example, it may be desirable to determine whether, and how often, a particular portion of the system microcode is accessed. In such a case, a probe instruction can be inserted, which can in turn be captured by the performance monitor 200.

In store mode, no counter signals are presented. Instead, eight of the twelve output pins are used to present register data, and the other four are used for clock and synchronization signals, and probe instruction signals. Table 5 below illustrates one embodiment of the invention for both sample mode and store mode where twelve pins are used for the external interface 230:

TABLE 5

| Pin | Sample Mode | Store Mode |
| --- | --- | --- |
| 0 | Sync | Sync |
| 1 | Clock | Clock |
| 2 | PRBA | PRBA |
| 3 | PRBC | PRBC |
| 4 | Counter bit 0 | Register bit 0 |
| 5 | Counter bit 1 | Register bit 1 |
| 6 | Counter bit 2 | Register bit 2 |
| 7 | Counter bit 3 | Register bit 3 |
| 8 | Register bit 0 | Register bit 4 |
| 9 | Register bit 1 | Register bit 5 |
| 10 | Register bit 2 | Register bit 6 |
| 11 | Register bit 3 | Register bit 7 |

As can be seen from Table 5, and the external interface 230 of FIG. 3, pins 4–7 represent counter data in sample mode, and register data in store mode. These pins are represented by line 262 of FIG. 3, which illustrates the external interface 230 when in sample mode. Pins 8–11 represent register data in both modes, which can be seen on line 264. Pin 0 provides the sync signal, pin 1 provides the clock signal, pin 2 provides the PRBA signal, and pin 3 provides the PRBC signal for both modes. These four signals are shown as the clock and probe signals on line 266.

In one embodiment of the invention, up to 137 different counter and data signals can be transmitted via the external interface 230, despite the fact that only twelve access points are present. As previously described, this is due to the use of time-division multiplexing realized by controlling the output multiplexer 207 over time such that a plurality of transfers occur, divided in time, to transmit an entire data "packet". The present invention provides maximum visibility to hardware operations while using a minimum number of pin resources. Additional flexibility is provided in that performance characteristics may be added or deleted without changing the connector or pin totals or assignments. Additional features further illustrate the flexibility of the invention, including dynamic modification of registers in order to avoid stopping the system clock, the addition of trigger capabilities, and an adjustable output rate feature corresponding to the selected mode of operation.

Figure 4:
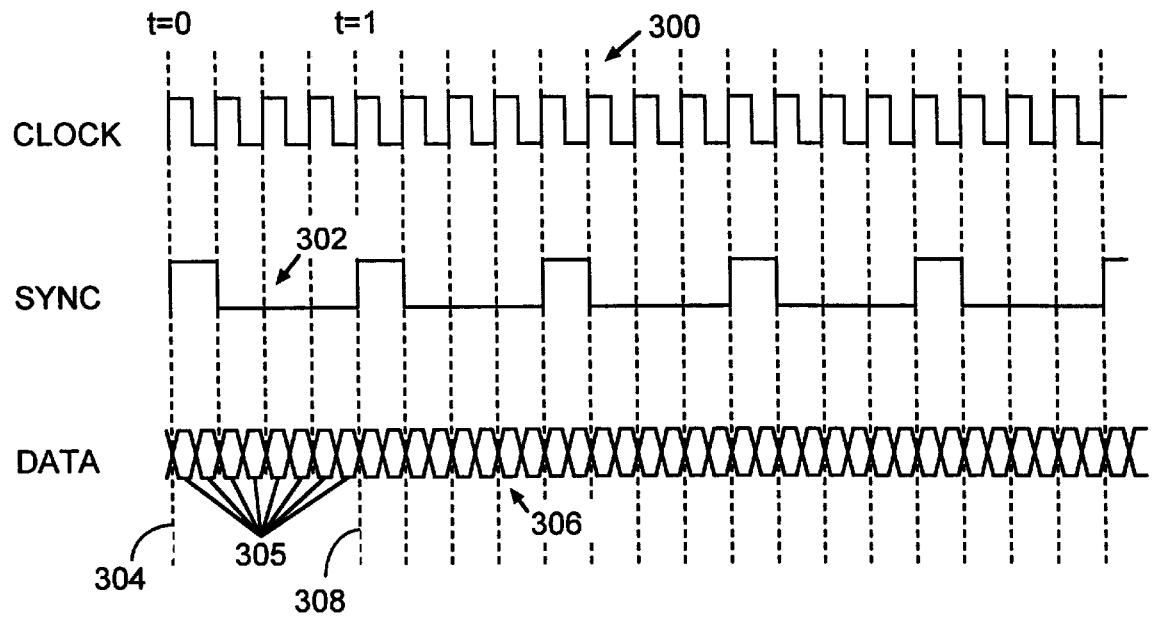
FIG. 4 and 5 are timing diagrams illustrating the clock and synchronization signals used to transmit the performance signals from the external interface.

FIG. 4 is a timing diagram illustrating the clock and synchronization signals used to transmit the performance signals from the external interface 230. An oscillating clock signal 300 is used in connection with a synchronization signal 302 to transmit the performance signals in an orderly fashion. Each time the synchronization signal 302 is activated (e.g., at time t=0 on line 304), a data packet begins to transfer from the external interface 230. A data packet includes multiple "transfers" 305, shown in the data stream 306. As can be seen in FIG. 4, two data transfers occur during each clock period of the clock signal 300. The synchronization signal 302 is used to begin the transfer of a data packet from the external interface 230. In FIG. 4, there are eight "transfers" 305 per data packet between time t=0 on line 304 and time t=1 on line 308.

Each data transfer includes a predetermined number of performance characteristic signals, wherein the total number of performance characteristic signals comprises the entire data packet. Therefore, the period of the synchronization signal 302 may be set to the appropriate time to allow for the transfer of an entire data packet, depending on the number of bits that are required to be sent. For example, where each data transfer can transfer eight data bits, and sixty-four performance characteristic signals are being monitored, the data packet will include eight transfers to transmit the entire data packet.

In another embodiment of the invention, a packet identifier is included in the first transfer of the packet. At the time that an active triggering edge occurs on the synchronization signal 302 (e.g., at times t=0 and t=1 on lines 304 and 308 respectively), a packet identifier is transmitted from the external interface 230. This allows the transfer of variable numbers of performance characteristics, even where the synchronization signal 302 is set to a predetermined period. For example, where there are fifty-six register data signals and twenty-five counter data signals to be sent to an analyzing device, and each transfer is set up to include eight bits of information, two data packets can be successively transferred. The packet identifier is used to indicate the start of each packet. Table 6 below illustrates how two successive data packets can be transmitted via the external interface 230:

TABLE 6

| TRANSFER NUMBER | SYNCHRONIZATION SIGNAL STATE | BITS 4–7 | BITS 8–11 |
|---|---|---|---|
| 0 | 1 | PACKET TYPE 0001 | MODE SELECTION |
| 1 | 0 | COUNTERS 0–3 | REG BITS 0–3 |
| 2 | 0 | COUNTERS 4–7 | REG BITS 4–7 |
| 3 | 0 | COUNTERS 8–11 | REG BITS 8–11 |
| 4 | 0 | COUNTERS 12–15 | REG BITS 12–15 |
| 5 | 0 | COUNTERS 16–19 | REG BITS 16–19 |
| 6 | 0 | COUNTERS 20–23 | REG BITS 20–23 |
| 7 | 0 | COUNTERS 24–27 | REG BITS 24–27 |
| 0 | 1 | PACKET TYPE 0002 | MODE SELECTION |
| 1 | 0 | COUNTERS 0–3 | REG BITS 28–31 |
| 2 | 0 | COUNTERS 4–7 | REG BITS 32–35 |
| 3 | 0 | COUNTERS 8–11 | REG BITS 36–39 |
| 4 | 0 | COUNTERS 12–15 | REG BITS 40–43 |
| 5 | 0 | COUNTERS 16–19 | REG BITS 44–47 |
| 6 | 0 | COUNTERS 20–23 | REG BITS 48–51 |
| 7 | 0 | COUNTERS 24–27 | REG BITS 52–55 |

From the above table it can be seen that the 28 counter bits are sent in each data packet, as there are only 28 counter bits present. However, the 56 register bits are split into two data packets, identified by packet identifiers PACKET TYPE 0001 and PACKET TYPE 0002. The mode selection register indicates whether the mode is store mode or sample mode.

The clock signal 300, synchronization signal 302 and packet identifiers are used to allow an external data analyzing device (such as logic analyzer 124 of FIG. 1) to identify the information being sent to it in an orderly fashion. By sending the data via the external interface 230, while providing a clock signal 300 and a synchronization signal 302 to clock and synchronize the analyzing device, orderly information transmission can occur.

Figure 5:
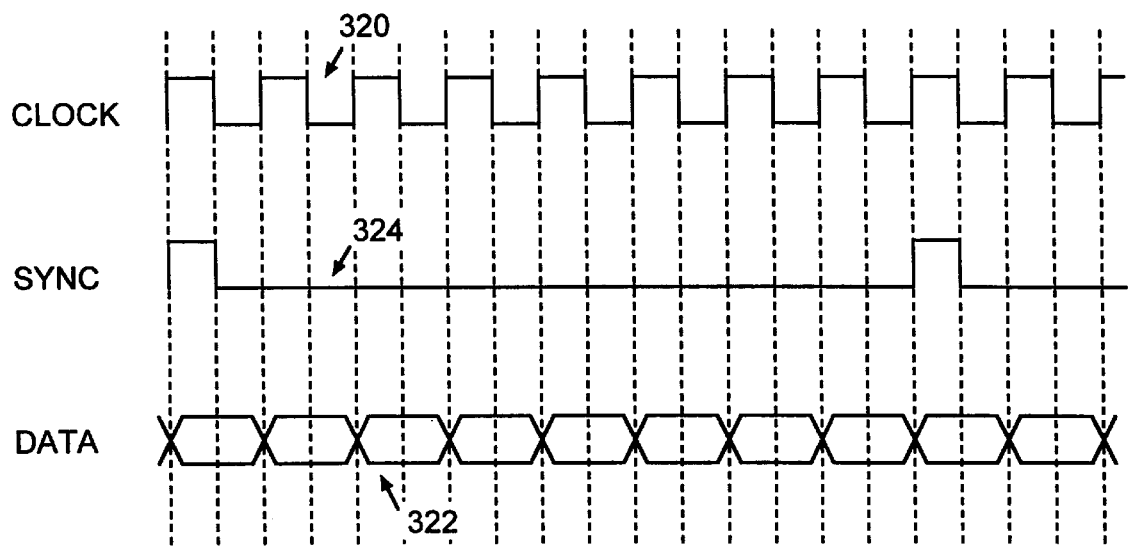

FIG. 5 is another timing diagram illustrating the clock and synchronization signals used to transmit the performance signals from the external interface 230. In the embodiment represented by FIG. 5, the clock signal 320 is slower than the clock signal 300 of FIG. 4. Only one transfer in the data stream 322 occurs every clock period of the clock signal 320, where two transfers occurred every clock period of the clock signal 300 of FIG. 5. The synchronization signal 324 works analogously to the synchronization signal 302 of FIG. 4. FIG. 5 illustrates that a clock signal rate may be manipulated with respect to the number of transfers occurring, in order to accommodate various speeds of analyzing devices coupled to the external interface 230.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A performance monitor for collecting a plurality of performance attributes of a circuit, comprising:
   registering means for latching a plurality of performance attribute signals;
   output means, coupled to the registering means, for outputting the performance attribute signals latched by the registering means in groups of performance attribute signals, wherein each of the groups is a subset of a total number of the performance attribute signals latched by the registering means; and
   time division means, coupled to the output means, for enabling the output means to output each of the groups of performance attribute signals at different times.

2. The performance monitor as in claim 1, further comprising performance attribute identification means for receiving a plurality of input signals, and for analyzing the plurality of signals to identify a particular predefined performance attribute signal to be latched by the registering means.

3. The performance monitor as in claim 1, further comprising:
   counting means for counting occurrences of selected input signals; and means, coupled to the counting means, for generating a corresponding performance attribute signal and providing the corresponding performance attribute signal to the registering means.

4. The performance monitor as in claim 3, further comprising means for selecting a number of the occurrences required before generating the corresponding performance attribute signal.

5. The performance monitor as in claim 1, further comprising:
   latch means for storing data provided by selected input signals; and
   means, coupled to the latch means, for providing a corresponding performance attribute signal to the registering means.

6. The performance monitor as in claim 5, further comprising latch enable means coupled to the latch means, for enabling the latch means to provide the corresponding performance attribute signal to the registering means upon receipt of a latch enable signal.

7. The performance monitor as in claim 6, further comprising event trigger means, coupled to the latch enable means, for generating the latch enable signal upon an occurrence of at least one predetermined event.

8. The performance monitor as in claim 7, further comprising sampling rate control means, coupled to the event trigger means, for assigning the number of the predetermined events that must occur prior to generating the latch enable signal.

9. The performance monitor as in claim 8, wherein the sampling rate control means comprises control register means for receiving control data corresponding to the number of the predetermined events that must occur prior to generating the latch enable signal.

10. The performance monitor as in claim 1, wherein hardware embodying the performance monitor is integrated with the circuit being monitored into a common component.

11. The performance monitor as in claim 1, further comprising mode selection means for selecting between a plurality of performance monitor operation modes.

12. The performance monitor as in claim 11, wherein the performance monitor operation modes control the speed at which the performance attribute signals are outputted by the output means.

13. The performance monitor as in claim 11, wherein the performance monitor operation modes control which of a plurality of performance attribute categories is to be outputted by the output means.

14. The performance monitor as in claim 1, wherein the output means comprises a common output terminal having a plurality of access points to output each of the groups of performance attribute signals.

15. The performance monitor as in claim 1, wherein the output means comprises multiplexing means for selecting sets of predetermined multiplexer inputs to receive corresponding ones of the performance attribute signals latched by the registering means, and for outputting respective ones of the groups of performance attribute signals.

16. The performance monitor as in claim 15, wherein the time division means comprises control generation means, coupled to the multiplexing means, for generating control signals to cause the multiplexing means to output the groups of performance attribute signals in succession.

17. The performance monitor as in claim 16, wherein the control generation means comprises a digital counter having counter outputs to generate the control signals, and wherein each of the groups of performance attribute signals is outputted at a different count of the digital counter.

18. The performance monitor as in claim 16, wherein the multiplexing means comprises a plurality of multiplexers, each commonly controlled by the control generation means, wherein each of the multiplexers provides one of the performance attribute signals for each of the groups of performance attribute signals.

19. A performance monitor for monitoring performance parameters of a circuit during real-time operation of the circuit, comprising:
a plurality of input registers, each coupled to a different signal path carrying a performance signal to be monitored;
an output multiplexer, coupled to receive the performance signals from the plurality of input registers, having a control input and a plurality of output signals; and
a control circuit coupled to the control input of the output multiplexer to generate control signals and provide the control signals to the control input, wherein the control signals control which of the performance signals will be outputted at a particular time.

20. The performance monitor of claim 18, wherein the control circuit comprises a plurality of control outputs to generate a plurality of the control signals, and wherein each of the control signals causes a different group of the performance signals to be outputted by the output multiplexer.

21. The performance monitor of claim 20, wherein each of the control signals further causes each of the different groups of the performance signals to be outputted at different times.

22. The performance monitor of claim 19, wherein the control circuit comprises a counter having a plurality of counter outputs to generate a plurality of the control signals, and wherein each of the plurality of control signals causes different groups of the performance signals to be outputted in succession.

23. The performance monitor of claim 19, wherein:
the output multiplexer comprises a plurality of separate multiplexers coupled to concurrently receive the control signals;
each of the separate multiplexers receives a predetermined number of the performance signals from the input registers; and
each of the separate multiplexers comprises a multiplexer output to output one of the predetermined number of performance signals received, wherein all of the multiplexer outputs together output a group of the performance signals.

24. The performance monitor as in claim 19, further comprising a register coupled between the plurality of input registers and the output multiplexer to latch each of the performance signals at an input of the output multiplexer.

25. The performance monitor as in claim 19, further comprising a mode selection register, coupled to the output multiplexer, to assign one of a plurality of performance monitor operation modes.

26. The performance monitor as in claim 19, further comprising:
a plurality of sampling rate registers;
a plurality of latching devices coupled to latch the performance signals from the plurality of input registers; and
a plurality of counters coupled to corresponding ones of the sampling rate registers, having counter outputs coupled to enable selected ones of the plurality of latching devices to provide the performance signals to the output multiplexer when each of the counters reach a count defined by its respective sampling rate register.

27. A method for collecting a plurality of performance characteristics of a circuit, comprising:
latching the plurality of performance characteristics;
outputting the performance characteristics in groups of performance characteristics, wherein each of the groups is a subset of a total number of the performance characteristics being collected; and
regulating the output of the groups of performance characteristics to output the groups of performance characteristics in succession.

28. A system for analyzing the performance of a computing system; comprising
(a) a performance monitor comprising:
(i) a plurality of input registers, each coupled to a different signal path carrying a performance signal to be monitored;
(ii) an output multiplexer, coupled to receive the performance signals from the plurality of input registers, having a control input, and an output terminal to provide a plurality of performance output signals; and
(iii) a control circuit coupled to the control input of the output multiplexer to generate control signals and provide the control signals to the control input, wherein the control signals control which of the performance signals will be outputted at a particular time; and
(b) a logic analyzer, coupled to the output terminal of the output multiplexer, to receive the plurality of performance output signals, and to analyze the performance of the computing system in response thereto.

* * * * *